United States Patent
Defrancq

(10) Patent No.: US 8,926,256 B2
(45) Date of Patent: Jan. 6, 2015

(54) FRONT LIFTING DEVICE FOR A TRACTOR

(76) Inventor: Hubert Defrancq, Guignicourt (FR)

( * ) Notice: Subject to any disclaimer, the term of this patent is extended or adjusted under 35 U.S.C. 154(b) by 919 days.

(21) Appl. No.: 13/126,891

(22) PCT Filed: Oct. 28, 2009

(86) PCT No.: PCT/IB2009/054770
§ 371 (c)(1),
(2), (4) Date: Jun. 29, 2011

(87) PCT Pub. No.: WO2010/049896
PCT Pub. Date: May 6, 2010

(65) Prior Publication Data
US 2011/0262255 A1    Oct. 27, 2011

(30) Foreign Application Priority Data
Oct. 30, 2008    (FR) ...................................... 08 06039

(51) Int. Cl.
| | | |
|---|---|---|
| B66C 23/00 | (2006.01) | |
| A01B 63/10 | (2006.01) | |
| B66C 23/44 | (2006.01) | |
| A01B 59/06 | (2006.01) | |
| A01B 63/108 | (2006.01) | |

(52) U.S. Cl.
CPC ............. *A01B 63/1006* (2013.01); *B66C 23/44* (2013.01); *A01B 59/064* (2013.01); *A01B 63/108* (2013.01)
USPC .............................. 414/680; 172/812; 91/530

(58) Field of Classification Search
CPC .......... E02F 3/651; E02F 3/43; E02F 9/2062; A01B 63/1006; A01B 63/108; A01B 59/064; A01B 59/048
USPC .............. 414/685, 680; 172/812; 91/525, 530
See application file for complete search history.

(56) References Cited

U.S. PATENT DOCUMENTS

| | | |
|---|---|---|
| 4,181,181 A | 1/1980 | Old |
| 4,216,975 A | 8/1980 | Schafer |

(Continued)

FOREIGN PATENT DOCUMENTS

| | | |
|---|---|---|
| DE | 299 01460 U1 | 9/2000 |
| EP | 0 182 091 A1 | 5/1986 |

(Continued)

OTHER PUBLICATIONS

French Search Report, dated Mar. 25, 2009, from corresponding French application.

*Primary Examiner* — Gerald McClain
(74) *Attorney, Agent, or Firm* — Young & Thompson

(57) ABSTRACT

A front lifting device for a tractor, for hitching a tool thereto and controlling the same, includes: a chassis to be attached to the bodywork of the tractor; two lower arms hinged to the chassis and including, at the end thereof furthest from the chassis, a hitching element for the tool; at least one working jack in which one of the elements, a cylinder or rod, is connected to the chassis and in which the other element, a rod or cylinder, is connected to one of the coupling arms, the working jack providing the movements of the arm or arms in a working stroke between a bottom position and a raised position; the device includes a length-adjustable linking member between one of the elements, a cylinder or rod, of the working jack and one of the parts made up of the chassis or an arm, the linking member being held in an extended state during normal working mode, and in a retracted state to enable the arm or arms to enter a retracted position.

17 Claims, 4 Drawing Sheets

(56) References Cited

U.S. PATENT DOCUMENTS

| | | | | |
|---|---|---|---|---|
| 4,393,942 A | * | 7/1983 | Mijot et al. | 172/445 |
| 4,715,770 A | * | 12/1987 | Kryscyk | 414/680 |
| 5,542,477 A | | 8/1996 | DeFrancq | |
| 6,085,501 A | * | 7/2000 | Walch et al. | 91/390 |
| 6,253,859 B1 | * | 7/2001 | Coenen | 91/530 |

FOREIGN PATENT DOCUMENTS

| | | |
|---|---|---|
| EP | 1 018 292 A2 | 7/2000 |
| FR | 2 408 989 A | 6/1979 |
| FR | 2 443 791 A | 7/1980 |
| FR | 2 688 378 A1 | 9/1993 |

* cited by examiner

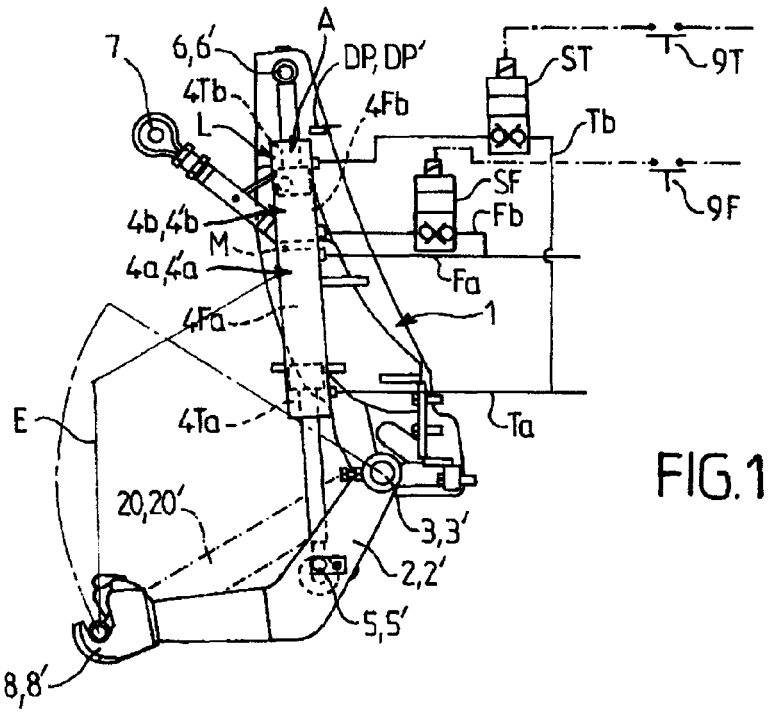
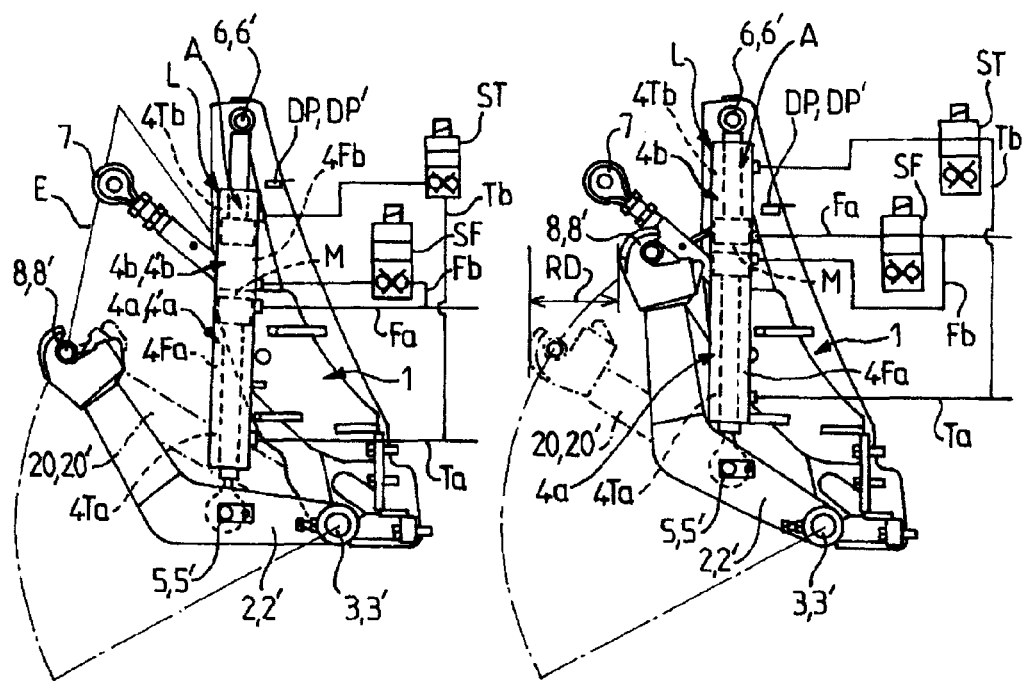
FIG.1
FIG.2
FIG.3

FRONT LIFTING DEVICE FOR A TRACTOR

BACKGROUND OF THE INVENTION

The invention relates to a front lifting device for a tractor, particularly an agricultural tractor, making it possible to hitch and maneuver an implement.

DESCRIPTION OF THE RELATED ART

Front lifts are designed with a lift stroke according to the definitions of the international standards for ensuring safe operation and compatibility with the various associated implements, including those that are driven by power take-off.

However, when these implements are not being used, it is often desired to be able to fold away the arms that extend forward in order to reduce their longitudinal overhang and to avoid exposing protruding portions in order to reduce the risk in the event of a frontal impact.

One solution commonly used consists in fitting the lift with foldable arms, according to patent FR 2688378 in the name of the same applicant. However, this solution complicates the structure. What is more, it does not allow an option of oscillation ensuring the following of transverse relief while carrying the implement.

Another solution has been proposed for allowing a front lift, fitted with a bottom stretcher structure with rigid connection between the two sides, to be folded. This solution consists in moving the bottom anchor point of the jacks so that the lift stroke is thereby increased. This solution has three major drawbacks:

- in long stroke mode, the lift capacity is limited;
- it is necessary to manually disconnect the stretcher in order to switch from a power mode to a stroke mode, which is tiresome and laborious;
- in stroke mode, there is a risk of incorrect use of the lift which requires a measurement of the angle of the third point as a means of blocking the stroke in the upward direction. According to the way in which the third point is connected to the implement, the lift stroke is variable and therefore cannot be predicted.

A more developed version of this solution is proposed in patent GB2439709 which describes a bottom stretcher furnished with connecting elements that can be locked in two positions: high stroke allowing folding and low stroke corresponding to the mode of use of the lift with implements.

Moreover, an assister jack allows the movement, without physical force, of the bottom stretcher during the transition from the low stroke mode to the high stroke mode. However, this solution has two considerable limitations:

- it is necessary to manually unlock the pins to switch from one position to the other: in addition to the normal stress, this operation can be made awkward because of the alignment clearances or the pins jamming in their holder;
- this solution does not solve the problem of operating the arm lifts allowing a transverse oscillation movement while carrying the implement.

EP 0182091 discloses a front lift for a tractor in which, in the working position, each arm is connected to a lever, controlled by a jack, with the aid of a substantially vertical link rod the length of which can be adjusted manually. When no implement is carried by the lift, it is possible to release the link rod from the lever and to raise the arm into a substantially vertical retracted position. All these operations must be carried out manually and take time.

SUMMARY OF THE INVENTION

The main object of the invention is to provide a lifting device that makes it possible to eliminate the problems cited above and provides additional advantages that widen the field of application of said front lift. It is also desirable that this device be robust and economical to produce.

According to the invention, a front lifting device of a tractor, particularly an agricultural tractor, making it possible to hitch and maneuver an implement, comprising:

- a frame to be fixed to the structure of the tractor;
- two lower arms articulated on the frame and comprising, at their end furthest from the frame, a coupling means for hitching the implement;
- at least one working jack of which one of the elements, cylinder or rod, is connected to the frame and of which the other element, rod or cylinder, is connected to one of the arms, this working jack making it possible to move the arm or arms along a working stroke between a low position and a raised position corresponding to the normal working mode, is characterized in that it comprises a movement means that can be controlled from a control, preferably located close to the lift, that is capable of moving the arm or arms into a foldaway position, more retracted than the raised working position, the movement from the working position to the foldaway position being obtained with no manual force and with no mechanical intervention. The movement from the foldaway position to the working position is obtained without distinction from the driver's position or from controls situated close to the front lift. Returning to working position automatically prevents the return to the foldaway position without action on the external control dedicated to the movement to foldaway mode.

The invention makes it possible to allow the movement of the lift into the foldaway position configuration only when the operator is certain that no implement remains attached to the lift. Specifically, an implement that is still attached to the front may not be visible from the driver's position; if the lift moves to the high foldaway position, when an implement is attached to the front, there is a considerable risk of material damage, because of possible interferences in the extreme high foldaway position. By providing that the control for the movement to the foldaway position configuration is outside the driver's position, in the vicinity of the lift, there is virtual certainty that the operator will notice the absence or presence of a hitched implement before deciding whether or not to control the foldaway position configuration. However, this control for changing to the foldaway position configuration may be in the driver's position, notably if a means is provided either to allow the operator to see whether an implement at the front of the tractor is or is not attached, or to provide an indication of whether or not such an implement is present.

The return from the foldaway position configuration to the normal working configuration creates no problems and can therefore be controlled from the driver's position.

Advantageously, the movement means comprises a linking means of adjustable length between one of the elements, cylinder or rod, of the working jack and one of the parts formed by the frame or an arm, this linking means being maintained, for the normal working mode, in a first state, extended or retracted depending on the position of the attachment point of the arm to the jack relative to the articulation of the arm on the frame, and being controlled in a second state, retracted or extended, so that the arm or arms move to the foldaway position, more retracted than the raised working position.

Preferably, the linking means of adjustable length consists of a second jack maintained in a first position, extended or retracted, in normal working mode, and controlled in a second position, retracted or extended, for the movement into the foldaway position.

The second jack is advantageously coaxial with the first jack and its cylinder has the same diameter and extends that of the first jack, the cylinders being attached.

Preferably, the cylinder of the second jack and the cylinder of the first cylinder are formed by portions of one and the same cylinder and are open to one another, a retaining ring being anchored in the inner wall of the cylinder and marking the separation between the two portions, and the second jack comprises a floating piston with a head and an extension of smaller diameter that protrudes into the cylinder of the first jack and consists of an abutment for the piston-rod assembly of the first jack in the "in" position, the retaining ring making it possible to stop the floating piston in the maximum extended position.

The cylinder of the second jack may be articulated at its top end on the frame while the rod of the working jack is articulated at its bottom end on the lift arm.

The internal volume of the two portions of one and the same cylinder is separated into three chambers of variable volume, namely:
- a rod-side chamber of the first working jack, between a closure plate traversed by the rod and the piston of the working jack,
- an intermediate chamber between the piston of the working jack and the floating piston,
- and a bottom-side chamber of the second jack, between the floating piston and the bottom of the jack, a retaining ring delimiting the travel of the floating piston, each chamber comprising in its wall a port for connection to a pipe for the inflow or outflow of fluid, the port being situated in a zone corresponding to the minimal volume of the chamber.

The supply of pressurized fluid is directed toward the bottom-side chamber and when the pressure in this chamber reaches a determined value, which occurs when the floating piston reaches abutment on the retaining ring, the supply of the intermediate chamber is controlled, the other, rod-side chamber being connected to the exhaust.

In the lifting device defined above, advantageously:
- the port of the bottom-side chamber of the second jack is connected to a first port of a directional flow valve via an electrically-controlled valve allowing a direct supply and a controlled draining;
- the port of the intermediate chamber is connected to the same first port of the directional flow valve with interposition of a nonreturn valve preventing flow to the chamber from the first port of the directional flow valve, but allowing flow in the opposite direction,
- a connecting duct furnished with a valve controlled according to the pressure in the bottom-side chamber, this connecting duct being connected on the one hand to the duct of the port of the bottom chamber between the electrically-controlled valve and the port of the directional flow valve, and, on the other hand, to the duct of the port of the intermediate chamber between the nonreturn valve and the port of the directional flow valve, the controlled valve opening when the pressure is sufficient in the bottom chamber and then ensuring the pressurized supply of the intermediate chamber.

The valve of the connecting duct can be controlled hydraulically, or controlled electrically by an electric switch sensitive to the pressure in the duct of the bottom chamber port. In this way, the bottom chamber is automatically filled as a priority before switching to working mode in order to prevent raising in foldaway mode in the absence of an intentional control.

According to another possibility, the jacks of the lifting device comprise separate cylinders, attached by their bottoms, particularly by welding, their rods being opposite one another.

According to the principle of the invention, a standard jack is replaced by an assembly of two jacks forming a double jack. On one side of the double jack the long-stroke working jack is positioned, used to operate the lift in its working stroke. On the other side of the double jack the second, short-stroke jack is positioned, designed to extend the stroke upward, beyond the working mode in order to reach the foldaway mode.

The rod of the second jack may be articulated at its top end on the frame while the rod of the working jack is articulated at its bottom end on the lift arm.

A working jack and a second jack may be associated with each of the lift arms.

The chambers of the second jack may be connected in parallel to the chambers of the working jack, with interposition of a valve making it possible to isolate, in the closed position, the chambers of the second jack from those of the working jack.

In normal working mode, the second, short-stroke jacks remain in the extended position. The second jacks may be connected in parallel to the long-stroke working jack(s) with a directional flow valve or a sealed valve ensuring, in the closed position, isolation between second short jacks and long working jacks.

Advantageously, the device comprises, in addition to the controls situated at the driver's position, in the cabin of the tractor, external controls situated outside the driver's cabin, notably with a button to be actuated, requiring the user to get out of the cabin in particular to control the move to foldaway mode. The device may comprise a switch to be actuated simultaneously with a button for controlling the raising of the working jack for controlling the movement into the foldaway position. When the external controls are activated, the switch, to be actuated simultaneously with the control button for raising the working jacks, makes it possible to open the valve or the directional flow valve allowing connection between the second jacks and the working jacks in order to extend the stroke in the upward direction in order to reach the foldaway position. In this manner, with a foldaway control preferably accessible only from the outside, there is no risk of interference between the working mode and the foldaway mode.

The fact that the user must use both his hands, outside, to actuate two buttons simultaneously makes it possible to ensure a safe operation preventing inadvertent operation. The movement from the working position to the foldaway position is obtained with no mechanical intervention.

Finally, this solution allows the use of independent arms allowing the lateral oscillation movements.

In order to supplement operational safety, provision is made optionally to add a sensor, which can detect the foldaway position of the lift, in order to allow operation in the cabin only when the second jack is in the extended position.

According to an alternative management solution, it is possible to incorporate an angular position sensor designed mainly to carry out automatic control. By calibrating the operating range of the sensor with reference only to the stroke of the working jacks (the second jacks being in the extended or lengthened position), any control is forbidden from the cabin of the tractor when the movement of the position sensor indicates a movement beyond the range of calibration.

In this manner, it is possible to supplement the safety function by making use of the position sensor, thus avoiding having to use a sensor controlling the extension of the second jacks (short jacks) in order to allow the operation of the in-cabin controls.

BRIEF DESCRIPTION OF THE DRAWING FIGURES

Apart from the arrangements set out above, the invention consists of a certain number of other arrangements which will be dealt with more explicitly below with respect to an exemplary embodiment which is described in detail with reference to the appended drawings but which is in no way limiting. In these drawings:

FIG. 1 is a view from the left of a front lift according to the invention, in the low working position.

FIG. 2 is a view from the left of the lift in the high working position.

FIG. 3 is a view from the left of the lift in the high foldaway position.

Figure 4:
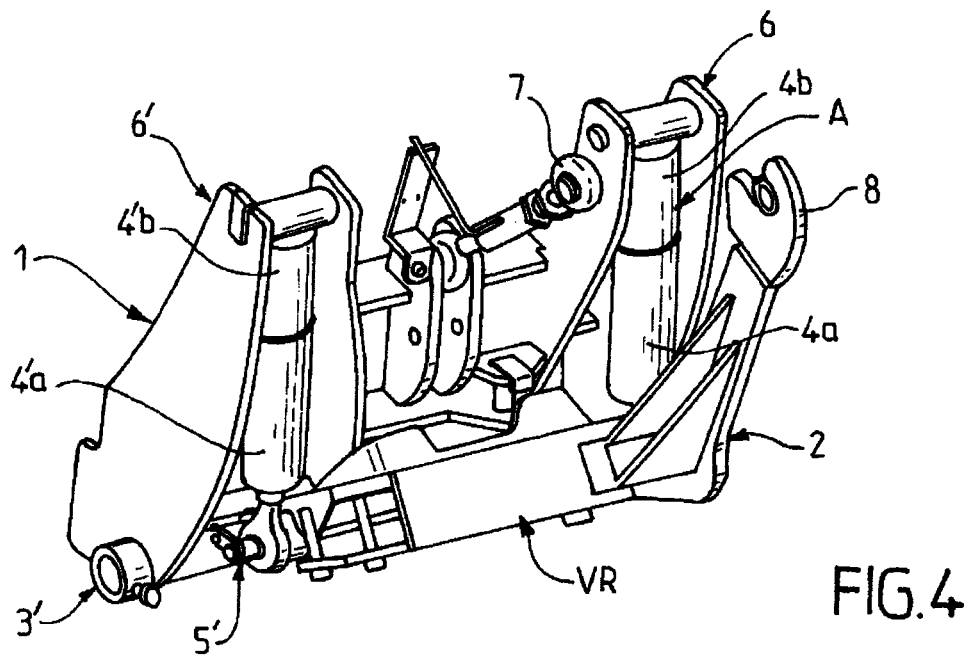
FIG. 4 is a front three-quarter partial view in perspective of the lift in the foldaway position, the left arm being withdrawn.

With reference to the drawings, a front lifting device for an agricultural tractor can be seen comprising a frame 1 suitable for being bolted to the structure of a tractor, and two lower hitch arms 2 and 2', only the left arm 2 being visible. Each arm is mounted so as to pivot about a hinge pin 3, 3' provided in the bottom portion of the frame 1.

DETAILED DESCRIPTION OF THE INVENTION

A left working jack 4a and a right working jack 4'a are designed to provide the lifting stroke or working stroke of the associated arm. The working stroke is that for which an implement is hitched to the hitching latches 8, 8' provided at the ends of the arms furthest from the frame 1. This working stroke is between a low position illustrated in FIG. 1 and a high position illustrated in FIG. 2. The rods of the jacks 4a and 4'a are respectively connected to the arms 2 and 2' by hinge pins 5-5'.

The arms 2, 2' are bent, in the shape of an obtuse angle, with their convexity turned downward. The rod of the jack is hitched to the portion of the arm between the hinge 3, 3' on the frame and the bend of the arm. The hinge pins 5, 5' of the rods on the arms are situated, in the example in question, in front (in the normal direction of travel of the tractor) of the hinge pins 3, 3' of the arms on the frame. As a variant, the arms could be extended toward the rear of the pins 3, 3' and the rods could be connected to the arms behind the pins 3, 3'; in this case, the device would be adapted as a consequence of the reverse in direction, the raising of the arms being obtained by extending the rod and the lowering by retracting the rod.

The device comprises a movement means A, that can be controlled exclusively by means of a dedicated control preferably located on the outside, suitable for moving the arm or arms 2, 2' into a foldaway position illustrated in FIG. 3, more retracted than the raised working position illustrated in FIG. 2. The movement from the working position to the foldaway position is obtained without manual force. The reverse movement from the foldaway position to the working position, which creates no risk of interference, can be obtained automatically from the cabin or from outside controls in order to actuate the front lift.

The movement means A advantageously comprises a linking means L of adjustable length between one of the elements, cylinder or rod, of the working jack 4a, 4'a, and one of the parts formed by the frame 1 or the arm 2, 2'. According to the exemplary embodiment of FIGS. 1-3, the hinge pins 5, 5' hinging the rods onto the arms are situated in front of the hinge pins 3, 3' hinging the arms onto the frame; in these conditions, the linking means L is kept in an extended state for the normal working mode (FIGS. 1 and 2), and is placed in a retracted state (FIG. 3) so that the arm or arms 2, 2' move to a foldaway position. The reverse would be controlled if the pins 5, 5' were situated behind the pins 3, 3'. In this case, the floating piston (according to FIGS. 6 and 7) should be situated on the rod side, but the operating mode would remain unchanged.

The linking means of adjustable length consists of a second jack 4b, 4'b held in extended position in normal working mode, and controlled to the retracted position for the movement to foldaway position. The rods of the jacks 4b and 4'b are respectively connected to the frame 1 by hinge pins 6-6'.

Preferably, the jacks 4a-4b and 4'a-4'b are coaxial, with cylinders of like diameter. They are combined to form an assembly of two jacks that are welded end-to-end by their bottom furthest from the rods, and the chambers of which opposite to the piston rod are separated by a partition M.

The working jack 4a, 4'a corresponds to the portion of the assembly that has a long stroke used during work and the second jack 4b, 4'b corresponds to the portion of the assembly having a shorter stroke used for the foldaway phase out of use, when no implement is coupled to the ends of the arms 2, 2'.

For the purposes of simplification, only the left side will be described in detail, but the features described apply fully to the right side.

Each set of two jacks 4a-4b and 4'a-4'b consists of four chambers: two rod-side chambers 4Ta and 4Tb of a jack and two barrel-side chambers 4Fa and 4Fb, that is to say on the side opposite to each rod.

The rod-side chambers 4Ta and 4Tb are connected together by pipes Ta-Tb, and the barrel-side chambers 4Fa and 4Fb are connected together by pipes Fa-Fb which are then connected to the source of pressurized oil generated by the tractor.

Inserted into the pipes Fb and Tb are electrically-controlled isolation valves SF and ST which do not allow the connection between 4Ta and 4Tb, and between 4Fa and 4Fb, unless they are controlled, which causes them to open. In the absence of control, the valves SF and ST are closed and isolate 4Tb from 4Ta and 4Fb from 4Fa.

Shown schematically, in dot-and-dash lines in FIGS. 1-3, are arms 20-20' according to a conventional arm design for which the total stroke is limited to the stroke generated by the portion 4a and 4'a of the lift jacks.

FIGS. 1 and 2 show that there is a perfect overlap of the lift strokes between the standardized working low position and high position, with an implement E (schematically represented by a single line) coupled to the lifting device.

FIG. 3 shows the arms 2-2' in the foldaway position when the jacks 4a and 4b on the one hand and 4'a and 4'b on the other hand are simultaneously retracted when no implement is coupled to the lifting device. FIG. 3 therefore illustrates the reduction in longitudinal overhang RD between the high working position and the high foldaway position.

In working mode, only the working jack 4a, 4'a is set in motion under the action of the pressure source, the second jack 4b, 4'b being isolated from the fluid source by the valves ST and SF and remaining in the extended state, rod out to the maximum.

Figure 5:
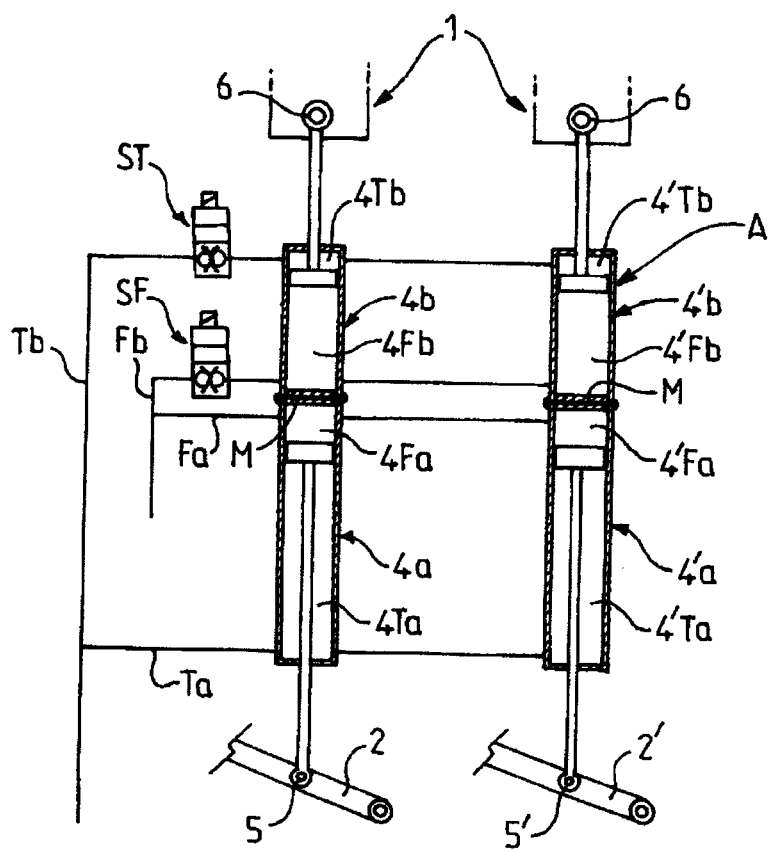
FIG. 5 is a diagram on a larger scale of the jacks and their hydraulic connections.

The jacks 4a-4b and 4'a-4'b have their respective chambers 4Ta-4'Ta, 4Fa-4'Fa, 4Tb-4'Tb, 4Fb-4'Fb connected together in parallel (FIG. 5). In this way, only one rod-side isolation valve ST and only one barrel-side isolation valve SF are necessary.

Usually, a removable locking plate VR (FIG. 4) rigidly connects the right arm 2' and left arm 2. With the method for connecting the pressurized fluid supply pipes according to the invention, it is possible, after removal of the locking plate VR, to allow lateral oscillation making it possible to follow a relief while carrying the implement connected to the lift by means of the hitching hooks 8-8' and of the third top point 7 with a connecting link rod.

A control switch, preferably that can be operated only on the outside of the driver's position, comprising the dedicated contacts 9F, 9T (FIG. 1) preferably with combined action, is provided for controlling the opening of the isolation valves SF and ST and allowing the passage of fluid in order to move to foldaway mode. This switch must be actuated at the same time as the controlling, usually by button, of the pressure source and flow rate.

In order to prevent an incorrect action of the lift when the latter is in the foldaway position, it is possible to add a detector DP, DP' for detecting the maximum extended position of the second jack 4b, 4'b (or the short portion of the set of two jacks) which then prevents any control from the driver's position if this maximum extended position is not reached.

The extending of the second jack 4b, 4'b, like its shortening, is obtained exclusively by simultaneously actuating the control of the valves SF, ST with the external controls (not shown) for raising/lowering the working jacks 4a, 4'a. The external controls are usually formed by buttons that are situated outside the driver's cabin and that can be actuated only by a user who is outside this cabin.

Another possibility for preventing an incorrect actuation of the front lift, when the latter is in the foldaway position, consists in calibrating the operating range on the basis of one angular sensor (not shown) per arm, as is widely used, measuring the angular movement of the lower arms 2, 2'. When the stroke of the angular sensors, coupled together, indicates a position beyond the normal working range, as occurs during the transition to foldaway mode, there is a cancellation of the functions controlled from the cabin. Only the external controls remain active.

Advantageously, the components of the dual jacks 4a-4b and 4'a-4'b have the same dimensions between the portion a and the portion b, outside the stroke, thus simplifying manufacture and management of replacement parts.

Figure 6:
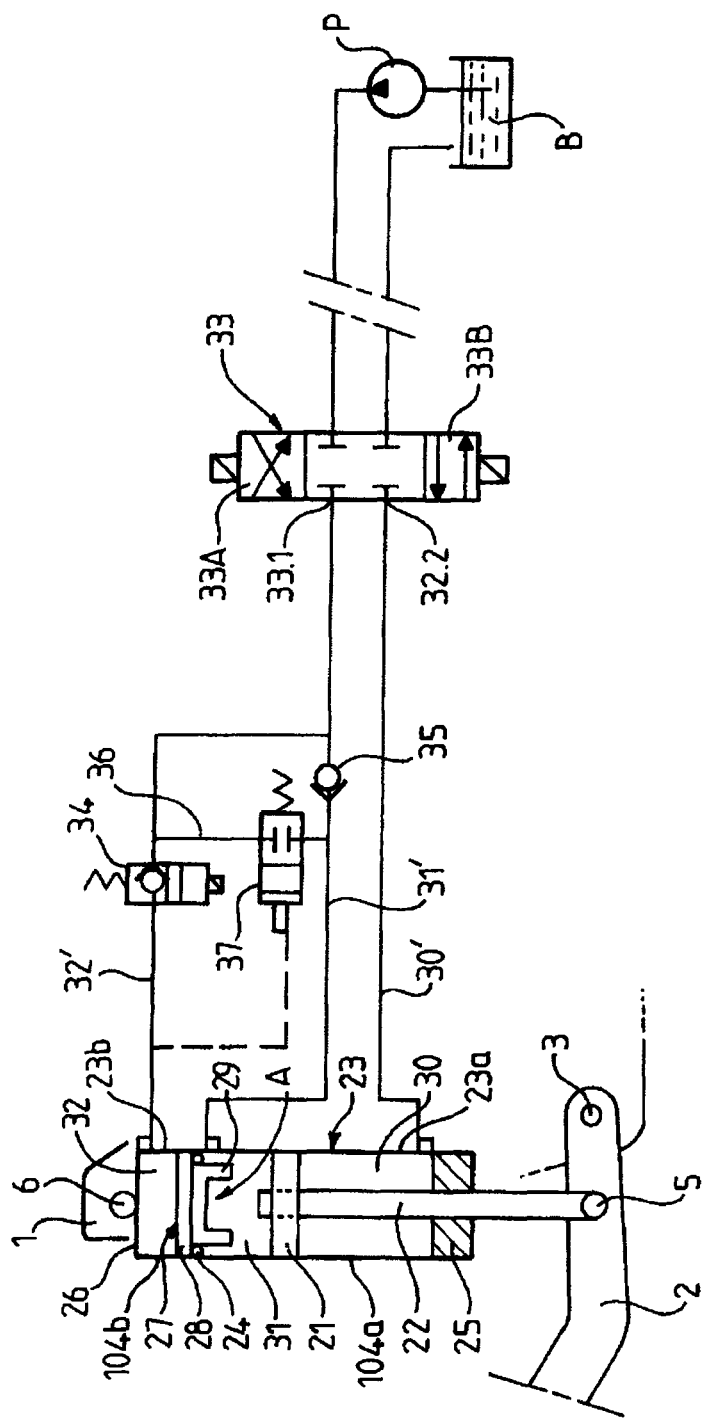
FIG. 6 is a simplified diagram of an advantageous embodiment of the invention.

With reference to FIG. 6, a particularly advantageous embodiment can be seen of the second jack 104b of a lifting device according to the invention, shown in brief. The second jack 104b makes it possible to adjust the distance between the frame 1 and the piston 21-rod assembly of the first jack 104a, while in the embodiment of FIGS. 1-3 the second jack 4b makes it possible to adjust the distance between the frame 1 and the cylinder of the first jack 4a.

The second jack 104b is coaxial with the first jack 104a. The cylinder 23b of the second jack and that 23a of the first jack are formed by portions of one and the same cylinder 23 and are open to one another. A retaining ring 24, notably formed by an open metal ring, is anchored in the inner wall of the cylinder 23 and marks the separation between the two portions 23a, 23b. On the furthest side of the second jack 10b, a removable plate 25, traversed in a sealed manner by the rod 21, closes one end of the cylinder, the other end being closed by a bottom 26.

The second jack 104b comprises a floating piston 27 with a head 28 and an extension 29 of smaller diameter which protrudes into the cylinder 23a of the first jack 104a. The floating piston 27 forms an abutment for the piston-rod assembly of the first jack in the "in" position. The retaining ring 24 makes it possible to stop the floating piston 27 in the "out" position.

The cylinder 23b of the second jack is articulated on the frame 1 either directly at its top end or via an intermediate yoke not shown. The rod 22 of the working jack 104a is articulated at its bottom end on the lift arm 2.

The internal volume of the two cylinders is separated into three chambers of variable volume, namely:
- a rod-side chamber 30 of the first working jack 104a, between the closure plate 25 and the piston 21 of the working jack,
- an intermediate chamber 31 between the piston 21 of the working jack and the floating piston 27,
- and a bottom-side chamber 32 of the second jack 104b, between the floating piston 27 and the bottom 26 of the jack.

Each chamber 30, 31, 32 comprises in its wall a port for connection to a pipe for the inflow or outflow of fluid, respectively 30', 31', 32'. The connection port is situated in a zone corresponding to the minimal volume of the chamber, namely: in the vicinity of the plate 25 for the port of the pipe 30'; in the vicinity of the ring 24 for the port of the pipe 31'; and in the vicinity of the bottom 26 for the port of the pipe 32'.

The port of the bottom-side chamber 32 of the second jack is connected to a first port 33.1 of a three-position directional flow valve 33, with a closed center, by means of a valve 34 electrically controlled remotely, in particular from a dedicated control preferably situated close to the external controls and to be actuated simultaneously. The port of the intermediate chamber 31 is connected to the same first port 33.1 of the directional flow valve with interposition of a nonreturn valve 35 preventing flow to the chamber 31 from the first port 33.1 of the directional flow valve, but allowing flow in the reverse direction.

A connecting duct 36, furnished with a valve 37 controlled according to the pressure of the bottom-side chamber 32, is connected on the one hand to the duct 32' of the port of the bottom chamber 32 between the electrically-controlled valve 34 and the port 33.1 of the directional flow valve, and on the other hand to the duct 31' of the port of the intermediate chamber 31, between the nonreturn valve 35 and the port of the intermediate chamber 31. The controlled valve 37 opens when the pressure is sufficient in the bottom chamber 32 and therefore ensures the pressurized supply of the intermediate chamber 31. The rise in pressure is obtained when the piston 27 reaches abutment on the ring 24 and ensures the automatic control of the working stroke without specific action preventing any user error. According to the embodiment of FIG. 6, the valve 37 of the connecting duct is controlled hydraulically.

The port of the rod-side chamber 30 of the first jack 104a is connected via the pipe 30' to a second port 33.2 of the directional flow valve 33.

When the directional flow valve 33 is in its closed-center position, illustrated in FIG. 6, the chambers 30, 31, 32 are isolated from the pressure source P and from the reservoir B.

When the directional flow valve is actuated to the position 33A corresponding to the coinciding of the ports situated on both sides of the directional flow valve, the port 33.1 is connected to the reservoir B, or exhaust, while the port 33.2 is connected to the pressure. The situation is reversed for the other working position 33B of the directional flow valve.

Operation is as follows.

In the normal working position of the lift, the chamber 32 is filled with oil and the floating piston 27 is in abutment against the ring 24. The extension 29 occupies its position furthest from the bottom 26 and determines the high end of stroke of the piston 21 and of the rod of the jack 104a for working with a hitched implement. The valve 34 is kept closed.

The raising of the implement hitched to the lift is obtained by switching the directional flow valve 33 to position 33B. The pressurized oil is sent into the chamber 30, while the chamber 31 is set to exhaust. The piston 21 can rise. The chamber 32 does not empty to the exhaust because the valve 34 remains closed. The working high end of stroke is limited by the floating piston 27 in the extreme low position.

The lowering of the implement hitched to the lift is obtained by switching the directional flow valve 33 to position 33B. The chamber 30 is set to exhaust. Simply by the weight of the implement, the rod 22 and the piston 21 can descend. However, the valve 34 is still open in the direction of circulation to the jack and the pressurized oil leaving through the port 33.1 is directed to the bottom chamber 32 ensuring an automatic control for keeping the bottom chamber in extension. When the chamber 32 is full, the pressure rises, which causes the valve 37 to open and allows the intermediate chamber 31 to be supplied with pressurized oil. The piston 21 is then lowered under pressure.

For the transition to the foldaway position, when no implement is hitched to the lift, the user simultaneously controls the movement of the directional flow valve 33 to position 33A and the opening of the valve 34. Since the chamber 30 is connected to the pressure, the piston 21 moves away from the plate 25 and the chambers 31, 32 connected to the exhaust empty. At the high end of stroke, the floating piston 27 is in abutment against the bottom 26 while the piston 21 is in abutment against the extension 29. The arm 2 occupies a foldaway position higher than the high working position. As the transition to the foldaway position is obtained only when there is no implement, the return to the working position is not obtained by gravity which ensures the filling of the bottom chamber 32 thus automatically controlling the working stroke by limiting raising in the absence of intentional control of the foldaway function.

Figure 7:
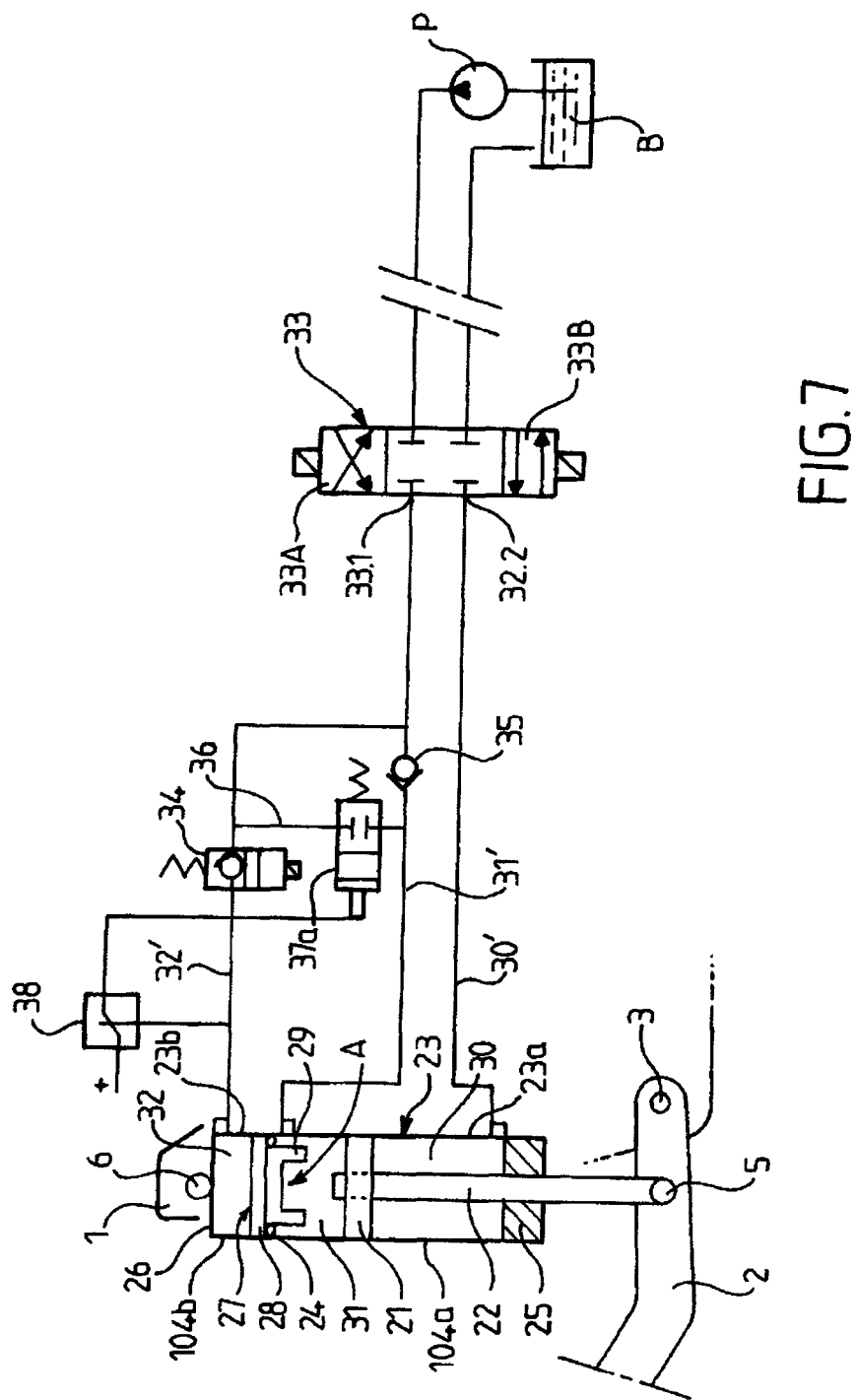
FIG. 7 is a simplified diagram of a variant embodiment of FIG. 6.

FIG. 7 illustrates a variant embodiment of FIG. 6. The hydraulically-controlled valve 37 of FIG. 6 is replaced by a valve 37a electrically controlled by a pressure-sensitive switch 38 in the bottom chamber 32. When this pressure exceeds a determined value, the switch 38 closes and provides electrical power to the valve 37a which opens.

A manual-control switch (not shown) may be inserted into the electrical line supplying the valve 37a so as to be able to remotely select the single-acting mode with this switch in the open position.

The invention allows a transition from working mode to foldaway mode without any manual force or waste of time. Moreover, the separation of the working and foldaway functions prevents any error during use.

Finally, the advantages of strength of the arms and of capability of transverse following of the relief while carrying the implement are preserved.

The respective positioning of the long and short strokes upward and downward does not change the result.

The invention claimed is:

1. A front lifting device for a tractor, including an agricultural tractor, to hitch and maneuver an implement, comprising:
    a frame (1) to be fixed to the structure of the tractor;
    two lower arms (2, 2') articulated on the frame and comprising, at their end furthest from the frame, a coupling means (8, 8') for hitching the implement;
    at least one working jack (4a, 4'a) of which one of the elements, cylinder or rod, is connected to the frame and of which the other element, rod or cylinder, is connected to one of the arms, this working jack allowing the arm or arms to move along a working stroke between a low position and a raised position corresponding to the normal working mode,
    a movement means (A) controlled from a control, configured for moving the arm or arms into a foldaway position, more retracted than the raised working position, the movement from the working position to the foldaway position being obtained with no manual force,
    the movement means (A) comprises a linking means (L) of adjustable length between one of the elements, cylinder or rod, of the working jack (4a, 4'a; 104a) and one of the parts formed by the frame or an arm, this linking means (L) being maintained, for the normal working mode, in a first state, extended or retracted depending on the position of the attachment point of the arm to the jack relative to the articulation of the arm on the frame, and being controlled in a second state, retracted or extended, so that the arm or arms move to the foldaway position, more retracted than the raised working position,
    the linking means (L) of adjustable length consists of a second jack (4b, 4'b; 104b) maintained in a first position, extended or retracted, in normal working mode, and controlled in a second position, retracted or extended, for the movement into the foldaway position, and
    the second jack (4b, 4'b; 104b) is coaxial with the first jack (4a, 4'a; 104a) and its cylinder has the same diameter and extends that of the first jack, the cylinders being attached.

2. The device as claimed in claim 1, characterized in that the cylinder (23b) of the second jack (104b) and the cylinder (23a) of the first cylinder (104a) are formed by portions of one and the same cylinder (23) and are open to one another, a retaining ring (24) being anchored in the inner wall of the cylinder (23) and marking the separation between the two portions, and the second jack (104b) comprises a floating piston (27) with a head (28) and an extension (29) of smaller diameter that protrudes into the cylinder (23a) of the first jack (104a) and consists of an abutment for the piston-rod assembly of the first jack in the "in" position, the retaining ring allowing the floating piston to stop in the "out" position.

3. The device as claimed in claim 2, characterized in that the cylinder of the second jack (104b) is articulated at its top end on the frame (1) while the rod (22) of the working jack (104a) is articulated at its bottom end on the lift arm (2).

4. The device as claimed in claim 2, characterized in that the internal volume of the two cylinders is separated into three chambers (30, 31, 32) of variable volume, namely:
    a rod-side chamber (30) of the first working jack (104a), between the closure plate (25) traversed by the rod and the piston (21) of the working jack,
    an intermediate chamber (31) between the piston (21) of the working jack and the floating piston (27), and a bottom-side chamber (32) of the second jack, between the floating piston (27) and the bottom (26) of the jack, a retaining ring (24) delimiting the travel of the floating piston (27), each chamber comprising in its wall a port for connection to a pipe for the inflow or outflow of fluid, the port being situated in a zone corresponding to the minimal volume of the chamber.

5. The device as claimed in claim 1, characterized in that it comprises an angular position sensor for an automatic control, so that, by calibrating the operating range of the sensor with reference only to the working stroke of the working jacks (4a, 4'a), the second jacks (4b, 4'b) being in the extended position, any control from the cabin of the tractor is forbidden when the movement of the position sensor indicates a movement beyond the range of calibration.

6. The device as claimed in claim 1, wherein,
the control that the movement means (A) controlled from is located close to the lift of the tractor.

7. The device as claimed in claim 1, characterized in that the internal volume of the two cylinders is separated into three chambers (30, 31, 32) of variable volume, namely:
a rod-side chamber (30) of the first working jack (104a), between the closure plate (25) traversed by the rod and the piston (21) of the working jack,
an intermediate chamber (31) between the piston (21) of the working jack and the floating piston (27),
and a bottom-side chamber (32) of the second jack, between the floating piston (27) and the bottom (26) of the jack, a retaining ring (24) delimiting the travel of the floating piston (27), each chamber comprising in its wall a port for connection to a pipe for the inflow or outflow of fluid, the port being situated in a zone corresponding to the minimal volume of the chamber.

8. The device as claimed in claim 7, characterized in that the supply of pressurized fluid is directed toward the bottom-side chamber (32) and when the pressure in this chamber reaches a determined value, which occurs when the floating piston reaches abutment on the retaining ring (24), the supply of the intermediate chamber (31) is controlled, the other, rod-side chamber (30) being connected to the exhaust.

9. The device as claimed in claim 8, characterized in that:
the port of the bottom-side chamber (32) of the second jack (104b) is connected to a first port (33.1) of a directional flow valve via an electrically-controlled valve (34);
the port of the intermediate chamber (31) is connected to the same first port (33.1) of the directional flow valve with interposition of a nonreturn valve (35) preventing flow to the chamber (31) from the first port (33.1) of the directional flow valve, but allowing flow in the opposite direction,
a connecting duct (36) furnished with a valve (37, 37a) controlled according to the pressure in the bottom-side chamber (32), this connecting duct being connected on the one hand to the duct of the port of the bottom chamber (32) between the electrically-controlled valve (34) and the port (33.1) of the directional flow valve, and, on the other hand, to the duct of the port of the intermediate chamber (31) between the nonreturn valve (35) and the port (33.1) of the directional flow valve, the controlled valve (37, 37a) opening when the pressure is sufficient in the bottom chamber (32) and then ensuring the pressurized supply of the intermediate chamber (31).

10. The device as claimed in claim 9, characterized in that the valve (37) of the connecting duct is controlled hydraulically.

11. The device as claimed in claim 9, characterized in that the valve (37a) of the connecting duct is controlled electrically by an electric switch (38) sensitive to the pressure in the duct of the bottom chamber port.

12. The device as claimed in claim 1, characterized in that the jacks (4a, 4'a; 4b, 4'b) comprise separate cylinders, attached by their bottoms, particularly by welding, their rods being opposite one another.

13. The device as claimed in claim 12, characterized in that the rod of the second jack (4b, 4'b) is articulated at its top end on the frame (1) while the rod of the working jack (4a, 4'a) is articulated at its bottom end on the lift arm (2, 2').

14. The device as claimed in claim 1, characterized in that it comprises a working jack (4a, 4'a; 104a) and a second jack (4b, 4'b; 104b) associated with each of the lift arms.

15. The device as claimed in claim 1, characterized in that the chambers (4Tb, 4Fb) of the second jack (4b) are connected in parallel to the chambers (4Ta, 4Fa) of the working jack (4a), with interposition of a valve (ST; SF), in the closed position, isolating the chambers of the second jack (4b) from those of the working jack (4a).

16. The device as claimed in claim 1, characterized in that it comprises a switch (9F, 9T) to be actuated simultaneously with a button for controlling the raising of the working jack (4a, 4'a), for controlling the movement into the foldaway position, in order to prevent any risk of interference between the working mode and the foldaway mode.

17. The device as claimed in claim 1, characterized in that it comprises at least one sensor (DP, DP') which can detect the foldaway position of the lift in order to allow operation in the cabin only when the second jack (4b, 4'b) is in the extended position.

* * * * *